Figure 1:
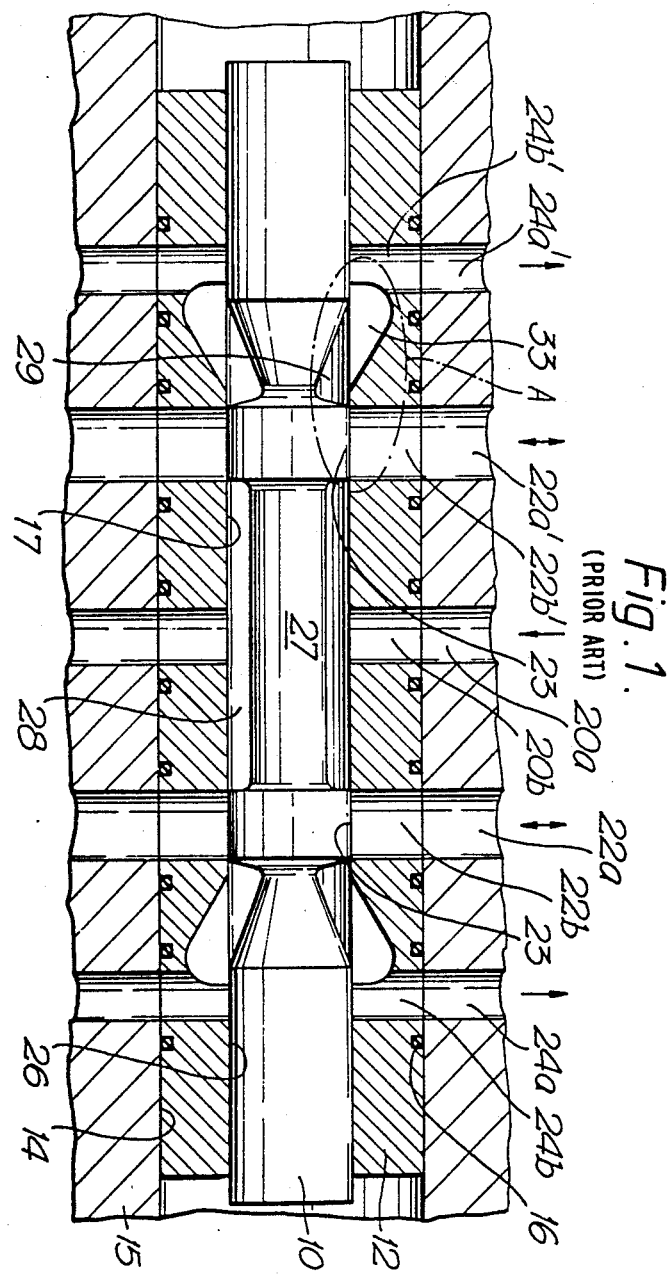

United States Patent [19]

Wood et al.

[11] Patent Number: 4,923,172
[45] Date of Patent: May 8, 1990

[54] FLUID CONTROL VALVE

[75] Inventors: Antony J. Wood, Hardingstone; George F. Gocher, Bletchley, both of United Kingdom

[73] Assignee: Ferranti International plc, Cheshire, England

[21] Appl. No.: 324,094

[22] Filed: Mar. 16, 1989

[30] Foreign Application Priority Data

Mar. 23, 1988 [GB] United Kingdom ............... 8806921

[51] Int. Cl.$^5$ .................... F16K 39/04; F16K 3/22
[52] U.S. Cl. ............................ 251/282; 137/625.69
[58] Field of Search ............. 251/282; 137/625.25, 137/625.69

[56] References Cited

U.S. PATENT DOCUMENTS

| 2,747,612 | 5/1956 | Lee ................................ 137/282 X |
| 2,765,378 | 10/1956 | Perry et al. ................ 137/625.69 X |
| 2,987,050 | 6/1961 | Oppenheimer et al. .... 137/625.69 X |
| 3,009,480 | 11/1961 | Miller ............................ 137/625.69 |
| 3,198,212 | 8/1965 | Junck et al. ............... 137/625.69 X |
| 4,155,535 | 5/1979 | Seamone ............................ 251/282 |
| 4,220,178 | 9/1980 | Jackson ............................ 251/282 X |

Primary Examiner—John Rivell
Attorney, Agent, or Firm—Kerkam, Stowell, Kondracki & Clarke

[57] ABSTRACT

In a fluid control valve, a force acting on the spool is produced by the inevitable inclination of the fluid flow into the spool chamber, and the force tends to be balanced by the fluid flowing over first and second surfaces of the spool, the inclination of the fluid flow as it leaves the spool chamber to a return port being less than, and of opposite sense to, the inclination of its entry. The fluid is received from the spool chamber by a chamber associated with the return port, the return port chamber being shaped to divert a portion of the fluid. In a known valve construction, the portion of the fluid is diverted to re-enter the spool chamber, to enhance the balancing force. In accordance with the present invention, however, the return port chamber is modified so that a portion of the fluid flow is directed to form a stable vortex, the effect of the vortex ensuring that the whole of the fluid flow leaves the spool chamber at substantially the required inclination, increasing the balancing force in this manner. A second stable vortex may be formed to ensure the integrity of the fluid flow as it enters the spool chamber; and to enhance the stability of the first vortex.

7 Claims, 2 Drawing Sheets

FLUID CONTROL VALVE

THIS INVENTION relates to a fluid control valve, and, in particular, to such a valve having a spool, and a return port, the arrangement being so that fluid flow over the spool, within a chamber formed thereby, produces "a balancing force" tending to cancel "a closing force" acting on the spool, "the closing force" being produced because the fluid enters the spool chamber, from an inlet port, at a finite acute angle to the longitudinal axis of the spool, and acts on the spool, "the closing force" having a component acting along the longitudinal axis of the spool, tending to displace the spool to cut off the fluid flow into the spool chamber.

It is known to provide such a valve in which the fluid flows from the inlet port, initially over a first surface of the spool, and then over a second such surface, to the return port, both surfaces being inclined at finite acute angles to the longitudinal axis of the spool, but in opposite senses, and the angle of inclination of the second surface being smaller than the angle of inclination of the first surface. By the provision of these two spool surfaces, partially defining the spool chamber, and by the provision of an appropriately shaped chamber associated with the return port, to receive the fluid as it leaves the spool chamber, the direction of momentum of fluid flowing over the spool is changed in a manner so that there is also produced "the balancing force" acting on the spool and having a component along the longitudinal axis of the spool, in a direction such that it tends to cancel "the closing force".

The first and second surfaces partially defining the spool chamber may comprise surfaces of revolution with respect to the longitudinal axis of the spool.

References in this specification, and the accompanying claims, to a port, include references to a sole port, or to an arrangement of a plurality of identical, separate ports, distributed about the circumference of the cylindrical chamber in which the valve spool is displaceable, and comprising, in effect, a single port.

If a plurality of constituent return ports are provided, there may be provided said plurality of identical, separate appropriately shaped chambers associated therewith, each chamber individually being associated with a constituent return port. For each combination of a return port, and associated return port chamber, the port may be spaced from the chamber, about the circumference of the cylindrical chamber in which the valve spool is displaceable. The plurality of chambers are distributed about the circumference of the cylindrical chamber in which the valve spool is displaceable, and together are considered to be a single chamber. Alternatively, a single chamber is associated with the sole return port, or with the plurality of constituent return ports, the sole chamber being defined partially by surfaces of revolution about the longitudinal axis of the spool. References in this specification, and the accompanying claims, to a return port chamber include any such arrangement.

The port co-operating with a return port, and considered to be an inlet port, may comprise either a sole inlet port, or a plurality of constituent inlet ports distributed about the circumference of the cylindrical chamber in which the valve spool is displaceable, and together considered to be a single inlet port. This is irrespective of whether the co-operating return port is a sole port, or a plurality of constituent ports. The sole, or any constituent, return port may not be in the same plane, including the longitudinal axis of the spool of the field control valve, as the sole, or any constituent, inlet port.

For any arrangement of the spool chamber, the return port chamber, and the return and inlet ports, it is convenient to consider only a plane including the longitudinal axis of the spool, and considered as including axes of symmetry of an inlet port, and a co-operating return port, and if a plurality of identical, separate return port chambers are provided, the plane being considered as including also an axis of symmetry of a constituent return port chamber. In this specification such a considered, possibly, imaginary, plane is referred to as the representational plane. Hence, it is convenient to refer to the angles of inclination of the spool chamber surfaces; and to refer to the cross-sectional shape of the return port chamber; in said representational plane.

Further, it will be understood that there may be a plurality of appropriate spool chambers distributed along the longitudinal axis of the spool of the fluid control valve, each appropriate spool chamber having co-operating inlet and return ports, possibly, each port comprising a plurality of separate constituent ports distributed about the circumference of the cylindrical chamber in which the valve spool is displaceable, and comprising, in effect, a single port.

At least in said representational plane, the first surface of the spool, usually, is arranged to be parallel to the inevitable direction of the fluid flow into the spool chamber from the inlet port.

In known arrangements for such a fluid control valve the balancing force may be enhanced by the provision of a return port chamber having a cross-sectional shape to direct a portion of the fluid flow back into the spool chamber, the fluid leaving this return port chamber, to re-enter the spool chamber, at least in said representational plane the fluid re-entering the spool chamber at a small acute angle to the longitudinal axis of the spool, and being of the opposite sense to the angle at which the fluid enters the return port chamber.

However, it has been discovered that any such cross-sectional shape of a return port chamber does not ensure that the balancing force has as large a value as is possible. Whilst for some applications including such a fluid control valve, for example, a two-stage servo system, with such a valve comprising the first stage, the balancing force is not required to be as large as possible, for some other applications, for example, in which the valve comprises a direct drive actuator, a larger balancing force is required to be produced. It is an object of the present invention to provide such a fluid control valve having a return port chamber with a cross-sectional shape, at least in said representational plane, modified in order to produce a balancing force even greater than the enhanced force obtained with the known arrangements referred to above.

According to the present invention a fluid control valve includes a spool and a return port, the arrangement is such that, in the operation of the valve, fluid flow over the spool, within a chamber formed thereby, produces a force tending to balance a force acting on the spool, the force required to be balanced being produced because the fluid inevitably enters the spool chamber, from an inlet port, at a finite acute angle to the longitudinal axis of the spool, the balancing force being produced because the spool changes the direction of momentum of fluid flowing over the spool in a desired manner, the fluid flowing, from the inlet port, initially over a first surface of the spool, and then over a second surface of the spool, to the return port, both surfaces, partially defining the spool chamber, being inclined at finite acute angles to the longitudinal axis of the spool, but in opposite senses, the angle of inclination of the second surface being smaller than the angle of inclination of the first surface, and the return port has associated therewith a chamber to receive the fluid as it leaves the spool chamber, the return port chamber is shaped to direct a portion of the fluid flow to form a stable vortex at least partially within the return port chamber, and the stable vortex is to be arranged so that the effect of the stable vortex is to extend into the spool chamber adjacent to, at least, the second surface of the spool.

The stable vortex is produced by modifying the cross-sectional shape, at least in said representational plane, of the return port chamber, from the known cross-sectional shape referred to above.

The effect of the stable vortex is to ensure that the whole of the fluid flow leaves the spool chamber at substantially the required inclination. Hence, the balancing force is greater than if the stable vortex had not been produced. The increase in the balancing force in this manner also is greater than the possible enhancement of the balancing force due to a portion of the fluid flow being diverted, in the known form of return port chamber referred to above, to re-enter the spool chamber. Thus, the effect of the stable vortex is such that the integrity of the fluid flow through the spool chamber is enhanced. In addition, the greater the integrity of the fluid flow passed the vortex, the greater the stability of the vortex.

The cross-section of the return port chamber, at least in said representational plane, may have any convenient shape, for example, either being generally hemispherical, or having a generally hemispherical part, to cause the required vortex to be produced, and to have stability.

Desirably, the arrangement is such that the effect of the stable vortex also extends to be adjacent to the first surface of the spool, enhancing both the integrity of the fluid flow as it enters the spool chamber, and the stability of the vortex.

If, because of the size, and/or the location, of the vortex produced, the effect of the vortex does not extend to be adjacent to the first surface of the spool, the valve may be arranged so that a second stable vortex is to be produced, in any convenient manner, adjacent to the first surface of the spool. The effect of the second stable vortex is to ensure the integrity of the fluid flow as it enters the spool chamber; and the stability of the first vortex is enhanced in an advantageous manner.

The second stable vortex may be produced by a second chamber provided in the valve body, possibly in what otherwise would comprise a land between the inlet and return ports, and arranged so that the effect of the second stable vortex is to extend into the spool chamber adjacent to, at least, the first surface of the spool. As, with the first chamber, associated with the return port, there may be provided a plurality of identical, separate second chambers distributed about the circumference of the cylindrical chamber in which the valve spool is displaceable, and together considered to be a single second chamber. Alternatively, a single second chamber is provided, defined partially by a surface of revolution about the longitudinal axis of the spool. References in this specification, and the accompanying claims, to a second chamber, include any such arrangement. The cross-sectional shape of the second chamber, at least in said representational plane, may be generally hemispherical.

Figure 2:
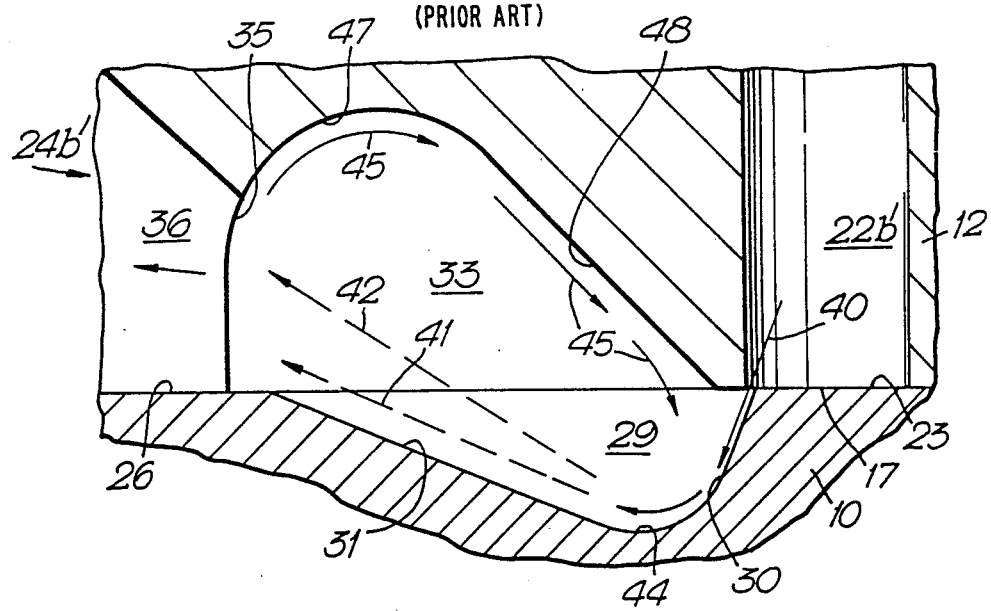
Figure 3:
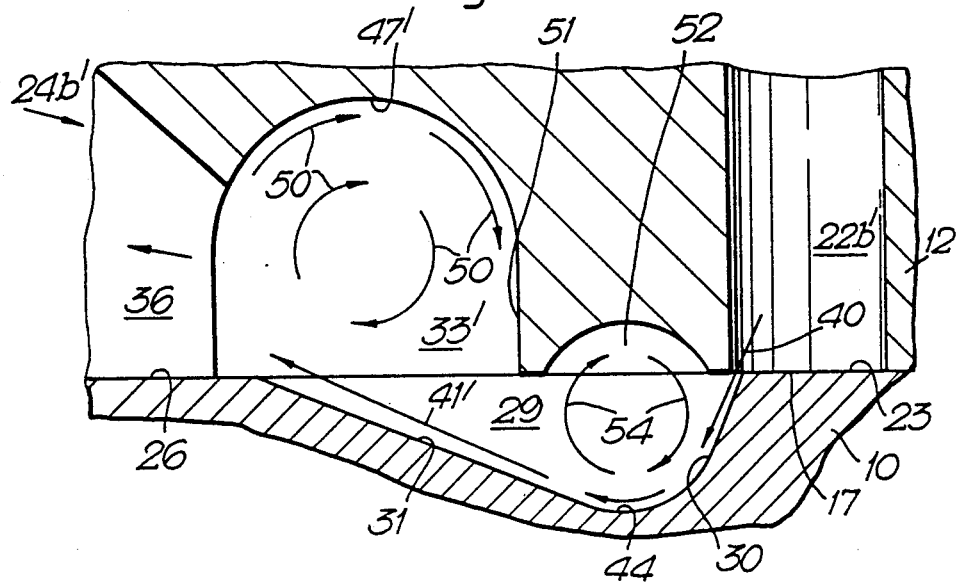

The present invention will now be described by way of example, with reference to the accompanying drawings, in which:

FIG. 1 is a side elevational section of a known form of a hydraulic control spool valve, in said representational plane, the direction of momentum of fluid flowing over the spool, from an inlet port to a return port, being changed to produce a balancing force acting on the spool, tending to cancel a closing force produced because the fluid inevitably enters the spool chamber at a finite acute angle, FIG. 2 shows in greater detail the cross-sectional shapes of the spool chamber and a co-operating chamber associated with the return port, for changing the direction of momentum of the fluid flowing over the spool in the manner desired for the known control valve, this Figure comprising an enlargement of the part indicated at 'A' in FIG. 1, and FIG. 3 corresponds to FIG. 2, but shows a modification in accordance with the present invention of the cross-sectional shape of the return port chamber, the modified shape producing a stable vortex at least partially in the return port chamber, the effect of the stable vortex to ensure that the whole of the fluid flow leaves the spool chamber at substantially the required inclination; and the Figure also shows a second chamber for producing a second stable vortex at least partially therein, the effect of the second stable vortex to ensure the integrity of the fluid flow as it enters the spool chamber, and to enhance the stability of the first vortex.

FIG. 1 shows the arrangement of a hydraulic control spool valve, in said representational plane, the valve having a spool 10, displaceable along its longitudinal axis, and a co-operating sleeve 12. The sleeve 12 is mounted within a cylindrical aperture 14 of a body 15, annular O-ring seals 16 being provided at spaced locations along the longitudinal axis of the valve. The sleeve 12 defines a cylindrical aperture 17 in which the spool 10 is displaceable. Where appropriate, the aperture 17, conveniently, can be considered to be formed in the valve body.

Hydraulic fluid enters the valve through a centrally located port 20a in the body 15, and through a co-operating port 20b in the sleeve 12. When the valve is open the fluid flows to one of two service ports 22a, and 22a', in the body 15, over the appropriate land 23 in the spool 10, and via a co-operating service port 22b, or 22b', in the sleeve 12. The fluid flows from the other service port 22b', or 22b, respectively, to the associated one of two return ports 24a', or 24a, in the body, via a co-operating return port 24b', or 24b, in the sleeve.

The spool 10 is shown in its central, closed position, in which the intermediate spool lands 23 close the service ports 22b, and 22b', in the sleeve 12. The ends of the spool comprise lands 26. Between the two intermediate spool lands 23 is a reduced diameter portion 27 of the spool, the chamber 28 provided by this reduced diameter portion 27 of the spool being normally in communication with the inlet port 20b in the sleeve 12.

When the valve is open, and the hydraulic fluid flows to, say, the service port 22b, of the two service ports, over a land 23, the hydraulic fluid flows from the other service port 22b', to the associated return port 24b', via a spool chamber 29. It is convenient to consider that the service port 22b' comprises an inlet port in respect of the associated spool chamber 29. The port considered to be the inlet port 22b', the spool chamber 29, and part of the co-operating return port 24b', shown within the dotted line A in FIG. 1, are shown in greater detail in FIG. 2. The spool chamber 29 is defined partially by first and second surfaces of revolution, 30 and 31, of the spool, with respect to the longitudinal axis of the spool. The return port 24b' is associated with a chamber 33 formed in the sleeve 12, and defined partially by a surface of revolution 35 with respect to the longitudinal axis of the spool. The return port chamber 33 is arranged to receive the fluid flow from the spool chamber 29, and communicates, via a passage 36, with the return port 24b'. The return port 24b' is not shown in FIG. 2.

The lands 26 provided by the ends of the spool are arranged to close the return ports 24b, and 24b', in the sleeve, to ensure that the fluid flow from the spool chambers 29 to the return ports 24b and 24b' is via the return port chambers 33.

The hydraulic fluid enters the spool chamber 29 from the port considered to be the inlet port 22b', over the control edge of the spool land 23. Inevitably the fluid flow into the spool chamber 29 is at a finite acute angle to the longitudinal axis of the spool, as indicated by the arrow 40 in FIG. 2.

The first spool surface 30 is parallel to the direction of the fluid flow entry into the spool chamber 29.

Because of the inclination of the fluid flow 40 into the spool chamber 29, there is a force, having a component acting along the longitudinal axis of the spool, and acting on the spool, tending to displace the spool to cut off the fluid flow into the spool chamber. It is required to tend to cancel the closing force by producing a balancing force acting on the spool, by changing the direction of momentum of fluid flowing over the spool, from the inlet port 22b' to the return port 24b', in the appropriate manner.

In order that the direction of momentum of the fluid flowing over the spool in the chamber 29 is changed in the desired manner, the fluid flow, after leaving the first surface 30, passes over the second surface 31, as indicated generally by the dotted arrows 41 and 42, the second surface 31, also being inclined at a finite acute angle to the longitudinal axis of the spool. In particular, the acute angles of inclination of the first and second surfaces 30, and 31, are of opposite sense, and the angle of inclination of the second surface is smaller than that of the first surface. Between the first and second surfaces is a smoothly curved intermediate surface 44.

The return port chamber 33 is shaped so that a portion of the fluid flow entering the chamber from the spool chamber is diverted away from the passage 36 communicating with the return port 24b', this portion being indicated generally in FIG. 2 by arrows 45. The cross-sectional shape of the surface 35 of the return port chamber 33 is that of one-half of a pear, with the axis of symmetry of the whole pear lying on the surface of the sleeve 12 co-operating with the spool 10, and parallel to the longitudinal axis of the spool. The portion 45 of the fluid flow which is diverted within the return port chamber 33, is diverted by a curved part 47 of the surface 35, towards the inlet port 22b'. The diverted portion of the fluid flow, after passing over a part 48 of the chamber surface 35, providing the point-defining-part of the pear shape, re-enters the spool chamber 29 at a small acute angle to the longitudinal axis of the spool, and in a direction such that it acts on the spool, enhancing the balancing force.

Whilst the enhanced balancing force, produced by the hydraulic fluid flow through such shaped spool, and return port, chambers, sufficiently balances the closing force acting on the spool for applications, such as for the first stage valve of a two-stage servo system, it is inadequate for some other applications, for example, for a valve to be a direct drive actuator.

Because the magnitude of the balancing force acting on the spool is controlled by the difference between the magnitudes of the angles of inclination of the fluid flow leaving the spool chamber 29, and of the entry of the fluid flow into the spool chamber, it is desirable that the fluid flow should be both adjacent to, and parallel to, the second spool surface 31. Thus, for particular return port chamber, and spool chamber, shapes there is the greatest difference between the magnitudes of the angles of inclination of the entry to, and leaving from, the spool chamber of the fluid flow, and the balancing force has its greatest value. However, it has been discovered that with the known form of return port chamber 33, shown in FIG. 2, the fluid flow over the second spool surface 31 is dispersed, as indicated generally by the arrows 41 and 42 in dotted form. Some of the fluid flow leaves the spool chamber at an angle of inclination of a magnitude approaching that of its entry into the chamber, reducing the balancing force which is produced.

In accordance with the present invention, the cross-sectional shape of the return port chamber of FIG. 2 is modified, so that a portion of the fluid flow, is directed by the chamber to circulate therein, causing a stable vortex to be formed. Such a return port chamber is indicated at 33' in FIG. 3, and the fluid flow in this chamber is indicated generally by arrows 50. The point-defining-part 48 of the cross-sectional shape of the return port chamber 33 of FIG. 2 is omitted in the chamber 33'. The curved part 47' of the shape shown for the chamber 33' in FIG. 3 is generally hemispherical, and is on a surface part 51 extending radially with respect to the longitudinal axis of the spool. The hemispherical part 47' directs the portion 50 of the fluid flow to form the desired stable vortex.

The centre of curvature of the hemispherical part 47' of the return port chamber 33' is such that, if the part 47' had been circular in shape, the second surface 31 of the spool would have been substantially tangential thereto.

For the stable vortex, although it is substantially within the return port chamber 33', its effect extends into the spool chamber 29, and causes the fluid flow through the spool chamber to be closer to the second spool surface 31, as indicated generally by the arrow 41', than with the arrangement shown in FIG. 2. This causes the whole of the fluid flow to leave the spool chamber 29 at the desired small acute angle, and the balancing force produced, acting upon the spool, is greater than with the arrangement of FIG. 2. In addition, the greater the integrity of the fluid flow passed the vortex, the greater the stability of the vortex. Further, the balancing force produced, when a stable vortex is established with the portion 50 of the fluid flow in the return port chamber 33', is greater than the enhanced balancing force produced if a portion 50 of the fluid flow, instead, had been diverted to re-enter the spool chamber 29, in the manner shown in FIG. 2 for the fluid flow portion 45.

For particular return port chamber 33', and spool chamber 29, shapes, the balancing force has as large a magnitude as possible, and the vortex is as stable as possible, if, in addition, the fluid flow 40 over the first surface 30 of the spool maintains its integrity. However, the stable vortex produced in the return port chamber 33' may be such that its effect cannot extend to be adjacent to the first spool surface 30. This may be because of the size, and/or the location, of the vortex. Thus, it may be desirable to provide a second stable vortex, closer to the first spool surface 30 than the first stable vortex, and as also is shown in FIG. 3. Hence, a chamber 52 is provided in the sleeve 12, between the return port chamber 33' and the inlet port 22b'. In cross-section, the second chamber 52 is at least substantially hemispherical in shape; and is provided in what otherwise would be a land of the sleeve. The second stable vortex, indicated by arrows 54, and produced by the second chamber 52, extends into the spool chamber 29, and its effect is such that it has the desired result of maintaining the integrity of the fluid flow 40 as it enters the spool chamber; and the stability of the first vortex is enhanced in an advantageous manner. In section, the second chamber 52 is defined by a portion of a circle, having a centre such that, if the circle is completed, the first and second spool surfaces 30 and 31 would be tangential thereto, and the smoothly curved intermediate spool surface 44 would provide part of the circle.

The return port, and the associated return port chamber, may communicate with each other in any convenient way.

The stable vortex produced by the return port chamber may extend into the spool chamber.

The return port chamber may have any convenient shape to produce the required stable vortex, for example, instead of including a generally hemispherical part, it may be generally hemispherical in shape.

Further, the second stable vortex, if required, may be produced in any convenient way.

We claim:
1. A fluid control valve having
a body and defined within the body an inlet port, a return port and an aperture,
a spool contained within the aperture displaceable in operation along its longitudinal axis to control flow of fluid from inlet port to return port by way of the aperture, said spool having lands of substantially the same dimensions as the aperture to inhibit fluid flow therebetween and a spool chamber, defined by a portion of the spool of reduced dimensions between spool lands, said spool chamber having a first surface inclined to the longitudinal axis of the spool and arranged to receive fluid from the inlet port, a second surface inclined to the longitudinal axis at a smaller angle and in an opposite sense to the first surface, and an intermediate surface joining the first and second surfaces and return port chamber means, defined within the body, connected with the return port and disposed to receive fluid as it leaves the spool chamber, said return port chamber means being shaped to direct a portion of the fluid flow to form a first stable vortex at least partially within the return port chamber, the effect of said first stable vortex extending into the spool chamber adjacent to the second surface of the spool to keep the fluid flow between intermediate spool surface and outlet ports against the second surface of the spool, and to form a second stable vortex adjacent to the first surface of the spool, the effect of said second stable vortex keeping the fluid flow between inlet port and intermediate spool surface against the first surface of the spool.

2. A fluid control valve as claimed in claim 1 in which the return port chamber means is arranged to form said second stable vortex adjacent to the intermediate surface of the spool, the effect of which is to keep the fluid flow between the first and second spool surfaces against the intermediate surface.

3. A fluid control valve as claimed in claim 1 in which the return port chamber means includes a return port chamber, the cross-sectional shape of which, in a place containing the inlet port and the longitudinal axis of the spool, includes a portion comprising at least a generally hemispherical part to cause the first stable vortex to be produced.

4. A fluid control valve as claimed in claim 3 in which, in said plane containing the inlet port and longitudinal axis of the spool, the return port chamber has a generally hemispherical shape comprising a portion of which is within the chamber and walls extending between said portion and the spool-containing aperture perpendicular to the longitudinal axis of the spool.

5. A fluid control valve as claimed in claim 3 in which the return port means includes a second chamber, defined in the valve body between the inlet port and return port chamber, operable to cause formation of the second stable vortex partially in the second chamber and partially in the spool chamber.

6. A fluid control valve as claimed in claim 5 in which the second chamber cross-sectional shape, in a place containing the inlet port and the longitudinal axis of the spool, comprises a hemispherical part with the spool axially positioned to connect the inlet port and spool chamber.

7. A fluid control valve as claimed in claim 6 in which the return port chamber means is arranged to form said second stable vortex adjacent to the intermediate surface of the spool, the effect of which is to keep the fluid flow between the first and second spool surfaces against the intermediate surface.

* * * * *